Patented Dec. 15, 1953

2,662,830

UNITED STATES PATENT OFFICE 2,662,830

SETTLING OF FLUORESCENT SCREENS

Arthur John Halstead Darlaston, Hertford, England, assignor to General Electric Company, a corporation of New York No Drawing. Application May 27, 1952, Serial No. 290,345

Claims priority, application Great Britain June 18, 1951

2 Claims. (Cl. 117—33.5)

The present invention relates to the settling of fluorescent screens and more particularly to the depositing of such screens on glass or glass-like surfaces such as the face of a cathode ray tube.

In the manufacture of fluorescent screens, the application of the fluorescent material involves two main factors. First, the material must be applied uniformly to the surface or backing and second, a binder must be employed to cause it to adhere to the glass. One method used heretofore has been to apply a binder to the glass backing and then apply the fluorescent material as a fine powder which is allowed to settle on to the binder. In another method a suspension of the powdered fluorescent material in a binder is sprayed onto the glass backing. In accordance with a still further method, the fluorescent material is held in suspension in a liquid and allowed to settle onto the glass backing, binder material having been added at a suitable stage and the surplus liquid being finally decanted. The present invention is concerned with this latter method.

The main problem in this settling process of forming a fluorescent screen is that of combining quality in the finished product with speed of manufacture, since the settling and subsequent adhesion of the fluorescent material from the suspension is liable to take some time, for example, one or two hours or more which in quantity production is an undesirably long time.

For the purpose of improving the quality and uniformity of screens produced by this method as well as to decrease the total settling time, a process has been developed in which a suspension of the phosphor particles in an alkali silicate solution is settled through a dilute aqueous solution of an electrolyte such as barium nitrate or barium acetate as more fully described and claimed in copending application Serial No. 157,185 of Friedman, filed April 20, 1950. While this method gives a screen layer having good adhesion, the settling time necessary before the surplus liquid can be poured or decanted off is still substantial. It is believed that the effectiveness of this process is due to the presence of the soluble barium salt. The barium salt hastens the gelation of the potassium or sodium silicate by entering into chemical reaction with the silicate to form an insoluble alkaline earth silicate precipitate which acts as a binder for the phosphor.

The present invention is based on the discovery that further improvements can be obtained in this settling process forming a fluorescent screen by using a second electrolyte in addition to the soluble barium salt. The second electrolyte is a sparingly soluble calcium salt, specifically calcium metaborate, which also reacts with the alkali silicate to give an insoluble silicate. Preferably the calcium metaborate is mixed with the suspension of the fluorescent material in the alkali silicate solution and this suspension is then poured on top of a cushioning layer of a solution of barium nitrate.

Experiments have indicated that in order to obtain the desired results, it is necessary that both of the electrolytes, i. e., the soluble barium salt and calcium metaborate, be employed. For example, a fluorescent screen manufactured by first covering the glass screen or backing with a cushioning layer of pure water and thereafter adding a mixture of calcium metaborate, the phosphor and potassium silicate will have good adhesion after a few minutes settling time but when the excess settling medium is poured off, the edges of the fluorescent layer tend to slip down into the usable face area of the tube.

In the process in the present invention, it is felt that the following action occurs; the barium silicate obtained by reaction of the barium salt with the alkali silicate coats the glass backing with a layer to which the phosphor particles cling, but only after the passage of some time does this layer become sufficiently well held to survive the action of decanting or pouring off the excess solution from the glass surface. The formation of a layer of calcium silicate on the surface of the particles of the fluorescent material by reaction of the calcium metaborate with the alkali silicate greatly reduces this consolidation time, thus allowing the decantation or pouring off step to be performed much sooner.

The alkali silicate solution employed in the practice of the present invention is preferably a potassium silicate solution obtained by diluting a commercially available solution with an equal or approximately equal amount of water. A commercially available solution has, for example, the following specifications: molecular ratio $1K_2O : 3.9 SiO_2$, percentage $K_2O$—7.8%, and specific gravity=1.25. By diluting such a solution with an equal part of water, there is obtained a dilute potassium silicate solution having a specific gravity of about 1.1.

The cushioning layer of barium salt solution preferably has a barium nitrate or acetate concentration of about 0.5 gram per liter of solution. While it is highly desirable to work very close to this barium salt concentration, satisfactory results can be obtained when the concentration ranges from about 0.4 to 0.6 gram barium salt per liter solution.

As the total quantity of the silicate suspension added to the cushioning layer and forming the remainder of the total settling medium is relatively small as compared with the quantity of the cushioning layer, the barium salt concentration of the entire settling medium may also be considered as being approximately within the limits of 0.4 to 0.6 gram per liter.

The concentration of the calcium metaborate is also critical. Ordinarily this electrolyte will be employed in amounts ranging from about 0.04 to 0.06 gram per liter of total settling medium or solution. Calcium metaborate is only sparingly soluble in water, and its solubility falls with the reduction in the number of molecules of water of crystallization. Best results are obtained by using a calcium metaborate having the approximate formula $Ca(BO_2)_2 2H_2O$ which can be obtained by heating a fully hydrated calcium borate containing 6 molecules of water in air to about 350° C. for 3 to 4 hours. It has been found that too high a borate solubility gives a flocculent precipitate of calcium silicate, which, on settling, gives undesirable inert spots on the screen layer, whereas too low a borate solubility gives poor adhesion and consequent slipping of the phosphor layer, particularly at the edges.

The present process is, of course, not limited in its application to settling a specific phosphor and may be used, for example, with the zinc sulphite, zinc cadmium sulphide phosphors, zinc silicate phosphors, magnesium silicate phosphors, zinc beryllium silicate phosphors, and zinc oxide phosphors.

The following is a specific example illustrating the manner in which the process of the present invention may be carried into effect.

Into a 12" round bulb or tube was poured 4,000 cc. of a .05% barium nitrate solution. After this solution had come to rest, there was added through a distributing rose, 400 cc. of a suspension of phosphor and finely-divided calcium metaborate in a potassium silicate solution having a specific gravity of 1.1. The quantity of phosphor was 2.5 grams and of calcium metaborate 0.25 gram. The calcium metaborate contained 1 molecule of water of crystallization. After 15 minutes the bulb was tilted on a tilting table and the excess settling medium poured off. The remaining phosphor layer was of good quality and possessed excellent adhesion with no indication of slip at the edges. The settling time required to obtain these results was quite short considering the low concentrations of electrolytes employed.

Experiments have shown that these results appear to be specific to the calcium metaborate. For example, the substitution of calcium hydroxide for the calcium borate does not result in any noticeable improvement of the wet adhesion of the screen layer. Likewise, the substitution of sodium borate for the calcium borate showed no improvement in the wet adhesion of the fluorescent layer.

What I claim as new and desire to secure by Letters Patent of the United States is:

1. The process of settling a phosphor coating onto the face of a cathode ray tube which comprises covering the face of said tube with a cushioning layer comprising a dilute solution of a soluble barium salt selected from the group consisting of barium nitrate and barium acetate, said solution containing from about 0.4 to 0.6 gram of said barium salt per liter of solution and thereafter adding to said cushioning layer a suspension of a phosphor in a potassium silicate solution containing a small amount of calcium metaborate, the amount of calcium metaborate in said silicate solution being such that the concentration thereof in the total settling medium including the silicate solution and the cushioning layer is from about 0.04 to 0.06 gram per liter.

2. In the process of forming a phosphor coating on a glass surface by settling the phosphor onto the surface from an aqueous settling medium comprising potassium silicate and a suspension of a powdered phosphor, the steps of including in said medium a quantity of barium nitrate in a concentration of about 0.5 gram per liter and calcium metaborate in an amount ranging from about 0.04 to 0.06 gram per liter of settling medium.

ARTHUR JOHN HALSTEAD DARLASTON.

References Cited in the file of this patent

UNITED STATES PATENTS

| Number | Name | Date |
|---|---|---|
| 2,108,683 | Leverenz | Feb. 15, 1938 |
| 2,412,654 | Sadowsky | Dec. 17, 1946 |
| 2,451,590 | Tidik et al. | Oct. 19, 1948 |
| 2,487,097 | Byler | Nov. 8, 1949 |